United States Patent
Im et al.

(10) Patent No.: US 10,461,348 B2
(45) Date of Patent: Oct. 29, 2019

(54) FUEL CELL SYSTEM AND METHOD OF CONTROLLING THE SAME

(71) Applicant: Hyundai Motor Company, Seoul (KR)

(72) Inventors: Se Joon Im, Seoul (KR); Jun Yeol Paek, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 640 days.

(21) Appl. No.: 15/143,789

(22) Filed: May 2, 2016

(65) Prior Publication Data

US 2017/0170501 A1 Jun. 15, 2017

(30) Foreign Application Priority Data

Dec. 11, 2015 (KR) .................. 10-2015-0177387

(51) Int. Cl.
*H01M 8/04* (2016.01)
*H01M 8/04791* (2016.01)
(Continued)

(52) U.S. Cl.
CPC ..... *H01M 8/04798* (2013.01); *H01M 8/0432* (2013.01); *H01M 8/0438* (2013.01); *H01M 8/04089* (2013.01); *H01M 8/04365* (2013.01); *H01M 8/04447* (2013.01); *H01M 8/04455* (2013.01); *H01M 8/04492* (2013.01); *H01M 8/04559* (2013.01); *H01M 2250/20* (2013.01); *Y02T 90/32* (2013.01)

(58) Field of Classification Search
CPC .............. Y02T 90/32; H01M 8/04798; H01M 8/04089; H01M 8/0432; H01M 8/04365; H01M 8/0438; H01M 8/04447; H01M 8/04455; H01M 8/04492; H01M 8/04559; H01M 2250/20

USPC .......................................................... 429/432

See application file for complete search history.

(56) References Cited

U.S. PATENT DOCUMENTS 6,852,302 B1 2/2005 Ukai et al.
8,273,486 B2 9/2012 Kaiser
(Continued)

FOREIGN PATENT DOCUMENTS

JP H08-241726 A 9/1996
JP H09-245826 A 9/1997
(Continued)

*Primary Examiner* — Anthony R Jimenez
(74) *Attorney, Agent, or Firm* — Mintz Levin Cohn Ferris Glovsky and Popeo, P.C.; Peter F. Corless (57) ABSTRACT

A fuel cell system and a method of controlling the same are provided. The fuel cell system includes a supplying pipe that supplies hydrogen and air to a stack and a gas concentration sensor that senses hydrogen and air impurities supplied to the supplying pipe. A supplying valve is disposed in the supplying pipe to adjust the hydrogen and air supply and a discharging pipe discharges the hydrogen and the air from the stack. A discharging valve is disposed in the discharging pipe to adjust the discharging of the hydrogen and the air. A controller operates with the gas concentration sensor to detect introduction of the impurities. Exhaust valves are disposed at the front and rear end of the stack to remove a polluted fuel when the impurities are introduced. When performance deteriorates due to the impurities, a cause of deterioration is determined, and stack performance is recovered.

11 Claims, 4 Drawing Sheets

(51) Int. Cl.
  *H01M 8/04089* (2016.01)
  *H01M 8/0432* (2016.01)
  *H01M 8/0438* (2016.01)
  *H01M 8/04492* (2016.01)
  *H01M 8/04537* (2016.01)
  *H01M 8/0444* (2016.01)

(56) References Cited

U.S. PATENT DOCUMENTS

| | | |
|---|---|---|
| 8,652,694 B2 | 2/2014 | Jahnke et al. |
| 2003/0157383 A1* | 8/2003 | Takahashi ......... H01M 8/04089 429/411 |
| 2006/0249399 A1 | 11/2006 | Uribe et al. |

FOREIGN PATENT DOCUMENTS

| | | |
|---|---|---|
| JP | 2001-146407 A | 5/2001 |
| JP | 2004-165058 A | 6/2004 |
| JP | 2005-158426 A | 6/2005 |
| JP | 2006-158006 A | 6/2006 |
| JP | 2006-318764 A | 11/2006 |
| JP | 2008-243430 A | 10/2008 |
| JP | 2010-146792 A | 7/2010 |
| KR | 2012-0020499 A | 3/2012 |
| WO | 2006/120874 A1 | 11/2006 |

* cited by examiner

FIG.2

| Condition | | A Stack | B Stack | C Stack |
|---|---|---|---|---|
| Performance to Initial Performance after Poisoning | No Recovery Process | 81% | 76% | 71% |
| | Driving/Reactivation | 91% | 86% | 88% |
| | Start/Stop Thirty Times | 96% | 92% | 97% |
| | Introduction of Air Into Stack | 99% | 100% | 100% |

FIG. 3

| Condition | | A Stack | B Stack | C Stack |
|---|---|---|---|---|
| Performance to Initial Performance after Poisoning | No Recovery Process | 90% | 80% | 87% |
| | High Output/Reactivation | 93% | 86% | 92% |
| | Start/Stop Thirty Times | 96% | 90% | 95% |
| | Introduction of Air into Stack | 98% | 95% | 96% |
| | Water Supply/Cleaning | 100% | 98% | 99% |

FIG. 4

FUEL CELL SYSTEM AND METHOD OF CONTROLLING THE SAME

CROSS-REFERENCE TO RELATED APPLICATION

This application is based on and claims the benefit of priority to Korean Patent Application No. 10-2015-0177387, filed on Dec. 11, 2015 in the Korean Intellectual Property Office, the disclosure of which is incorporated herein in its entirety by reference.

TECHNICAL FIELD

The present disclosure relates to a fuel cell system and a method of controlling the same, and more particularly, to a fuel cell system for diagnosing whether impurities of fuel cell reaction gas such as hydrogen and air are introduced into a fuel cell of a vehicle and recovering performance of a fuel cell stack when the impurities are introduced into the fuel cell of the vehicle, and a method of controlling the same.

BACKGROUND

Generally, a fuel cell is an electric power generation system that directly converts chemical reaction energy between hydrogen or hydrogen contained in a hydrocarbon based material such as methanol, ethanol, or natural gas and oxygen into electrical energy. The fuel cell, which is a clean energy source capable of substituting for fossil energy, generates outputs in various ranges by a stack configuration in which unit cells are stacked, and is used as a small and mobile portable power supply due to energy density four to ten times greater than that of a small lithium battery.

In addition, the fuel cell may be classified into a phosphoric acid fuel cell, a molten carbonate fuel cell, a solid oxide fuel cell, a polymer electrolyte membrane fuel cell, an alkaline fuel cell, and the like, based on a type of used electrolyte. These fuel cells are operated by the same principle, but different types of fuels, different operating temperatures, different catalysts, different electrolytes, and the like, are used in these fuel cells. Meanwhile, according to the related art, impurities of fuel cell reaction gas such as hydrogen and air may be introduced into in a fuel cell system of a vehicle while the vehicle is driven. In particular, stack performance may deteriorate due to the impurities introduced into the fuel cell system.

SUMMARY

The present disclosure provides a fuel cell system for diagnosing whether impurities of fuel cell reaction gas such as hydrogen and air are introduced into a fuel cell of a vehicle and recovering performance of a fuel cell stack when the impurities are introduced into the fuel cell of the vehicle, and a method of controlling the same.

According to an exemplary embodiment of the present disclosure, a fuel cell system may include: a supplying pipe configured to supply hydrogen and air to a stack; a gas concentration sensor configured to sense or detect impurities of the hydrogen and the air supplied to the supplying pipe; a supplying valve configured disposed in the supplying pipe to adjust the supply of the hydrogen and the air; a discharging pipe configured to discharge the hydrogen and the air from the stack; a discharging valve disposed in the discharging pipe to adjust the discharging of the hydrogen and the air; a controller operated together with the gas concentration sensor to detect introduction of the impurities; and exhaust valves disposed at the front end and the rear end of the stack to remove a polluted fuel in response to detecting introduction of the impurities.

In particular, the controller may include: a memory configured to store a driving condition including temperature, humidification, and pressure during driving a vehicle to determine whether the driving condition is normal and a level of normality; and a diagnosing part configured to be operated together with a controlling part (e.g., within the memory) and determine the driving condition and a diagnosed resistance value to determine whether the impurities are introduced and a level of the introduction of the impurities.

The controller may be configured to recover performance of the stack after the fuel is removed. The fuel cell system may include a stack inlet blocking valve disposed between the supplying pipe and the stack to block introduction of the hydrogen or the air into the stack. The supplying pipe may include a hydrogen supplying pipe configured to supply the hydrogen and an air supplying pipe configured to supply the air, the gas concentration sensor may include a hydrogen gas concentration sensor configured to sense the impurities of the hydrogen and an air gas concentration sensor configured to sense the impurities of the air. Additionally, the supplying valve may include a hydrogen supplying valve configured to adjust the supplying of the hydrogen and an air supplying valve configured to adjust the supplying of the air. The discharging pipe may include a hydrogen discharging pipe configured to discharge the hydrogen and an air discharging pipe configured to discharge the air, and the discharging valve may include a hydrogen discharging valve configured to adjust the discharging of the hydrogen and an air discharging valve configured to adjust the discharging of the air.

According to another exemplary embodiment of the present disclosure, a method of controlling a fuel cell system may include: measuring a stack voltage while a fuel cell vehicle is being driven after hydrogen is charged in the fuel cell vehicle; determining whether the stack voltage is less than a reference voltage; determining that purity of the hydrogen is abnormal to determine a driving condition, when the stack voltage is less than the reference voltage; determining whether the driving condition is normal; exhausting, removing, and refilling a polluted fuel when the driving condition is normal; determining whether the fuel cell vehicle needs to be driven again for a short period of time; performing a logic of repeating start-on/off when the fuel cell vehicle needs to be driven again for the short period of time; determining whether performance of stack is recovered; and determining that the performance reaches a normal state to end the logic, when the performance is recovered.

The driving condition may be temperature, pressure, coolant, and humidification states. When the stack voltage is greater than the reference voltage, the method may include determining that the purity of the hydrogen is normal. When the driving condition is abnormal, the method may include determining that the performance is deteriorated based on the driving condition. Additionally, when the fuel cell vehicle does not require to be driven again for a short period of time, the method may include opening an air blocking valve based on the start-off of the fuel cell vehicle. When the performance is not recovered, of the method may include repeating an additional recovering logic to perform an additional check.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
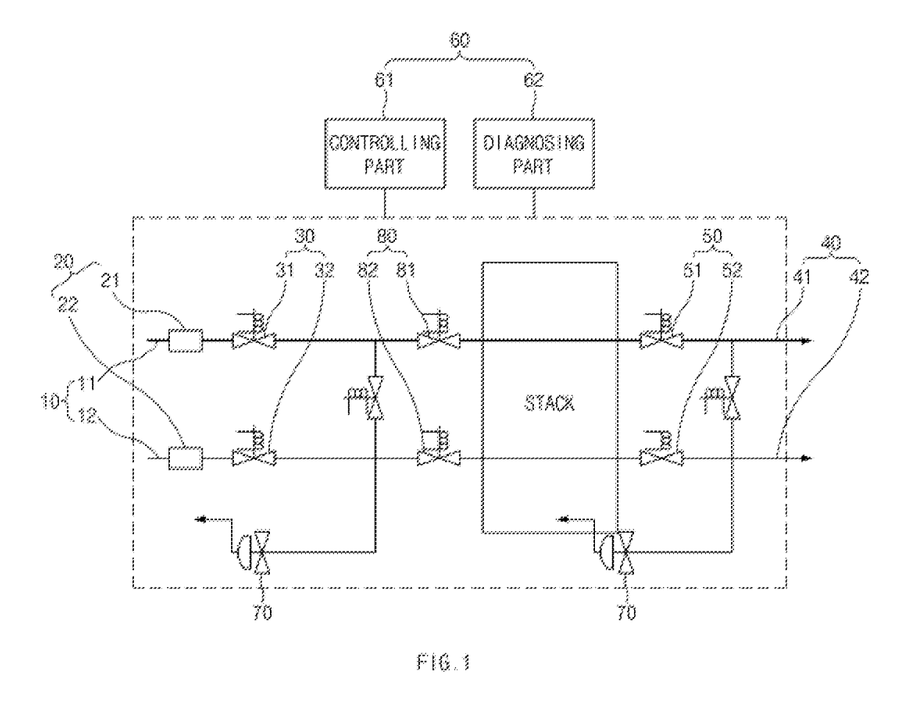
FIG. 1 is a view illustrating a fuel cell system according to an exemplary embodiment of the present disclosure.

Exemplary embodiments of the present disclosure will be described in detail with reference to the accompanying drawings. A fuel cell system according to an exemplary embodiment of the present disclosure may include a supplying pipe 10 configured to supply hydrogen and air to a stack, a gas concentration sensor 20 configured to sense impurities of the hydrogen and the air, a supplying valve 30 configured to adjust the supplying of the hydrogen and the air, a discharging pipe 40 configured to discharge the hydrogen and the air, a discharging valve 50 configured to adjust the discharging, a controller 60 configured to detect introduction of the impurities, and exhaust valves through which a polluted fuel may be removed or discharged during the introduction of the impurities, as illustrated in FIG. 1.

The supplying pipe, which may be connected to the stack within the fuel cell system to supply the hydrogen and the air, may include a hydrogen supplying pipe 11 and an air supplying pipe 12. In particular, the hydrogen supplying pipe 11 may be configured to supply the hydrogen to the stack, and the air supplying pipe 12 may be configured to supply the air to the stack. The gas concentration sensor may be configured to detect or sense the impurities of the hydrogen and the air supplied to the supplying pipe 10.

Meanwhile, the gas concentration sensor 20 may include a hydrogen gas concentration sensor 21 configured to sense or detect the impurities of the hydrogen introduced into the hydrogen supplying pipe 11 and an air gas concentration sensor 22 configured to detect or sense the impurities of the air introduced into the air supplying pipe 12. The supplying valve may be disposed in the supplying pipe 10 to adjust the supplying of the hydrogen and the air. Additionally, the supplying valve 30 may include a hydrogen supplying valve 31 configured to adjust the supplying of the hydrogen by the hydrogen supplying pipe 11 and an air supplying valve 32 configured to adjust the supplying of the air by the air supplying pipe 12.

The discharging pipe may be configured to discharge the hydrogen and the air from the stack. Particularly, the discharging pipe 40 may include a hydrogen discharging pipe 41 connected to the hydrogen supplying pipe 11 to discharge the supplied hydrogen from the stack and an air discharging pipe 42 connected to the air supplying pipe 12 to discharge the supplied air from the stack. The discharging valve may be disposed in the discharging pipe 40 to adjust the discharging of the hydrogen and the air. In addition, the discharging valve may include a hydrogen discharging valve 51 connected to the hydrogen discharging pipe 41 to adjust the discharging of the hydrogen and an air discharging valve 52 connected to the air discharging pipe 42 to adjust the discharging of the air.

Furthermore, the controller 60 may be operated together with the gas concentration sensor 20 to detect the introduction of the impurities. In particular, the controller 60 may include a controlling part 61 configured to determine whether a driving condition is normal and a diagnosing part 62 configured to determine whether the impurities are introduced. The controlling part 61 may be part of a memory configured to store a driving condition such as temperature, humidification, and pressure during driving a vehicle to determine whether the driving condition is normal and a level of normality.

The diagnosing part 62 may be operated together with the controlling part 61, and may be configured to determine the driving condition and a diagnosed resistance value to determine whether the impurities are introduced and a level of the introduction of the impurities (e.g., amount of impurities introduced) using the controlling part 61. The exhaust valves may be disposed at the front end and the rear end of the stack to remove the polluted fuel in response to detecting the introduction of the impurities.

Meanwhile, the controlling part 61 may be configured to recover stack performance after the fuel is removed. In addition, the fuel cell system according to an exemplary embodiment of the present disclosure may include a stack inlet blocking valve 80 disposed between the supplying pipe 10 and the stack to block introduction of the hydrogen or the air into the stack. Particularly, the stack inlet blocking valve 80 may include a hydrogen stack inlet blocking valve 81 configured to block or restrict the introduction of the hydrogen and an air stack inlet blocking valve 82 configured to block or restrict the introduction of the air.

Figure 2:
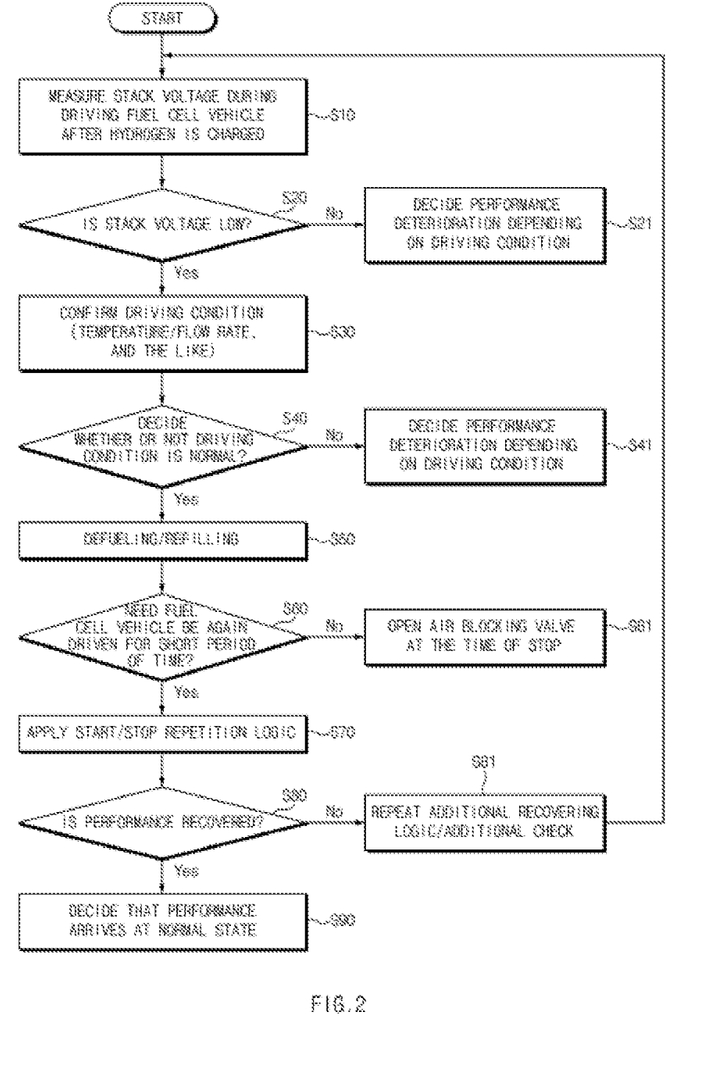
FIG. 2 is a flow chart illustrating a method of controlling a fuel cell system according to an exemplary embodiment of the present disclosure.

In addition, a method of controlling a fuel cell system according to an exemplary embodiment of the present disclosure may include measuring a stack voltage (S10), comparing the stack voltage and a reference voltage (S20), confirming a driving condition (S30), determining whether the driving condition is normal (S40), exhausting, removing, and refilling a polluted fuel (S50), determining whether the vehicle is driven again (S60), repeating start-on/off of the vehicle (S70), determining whether stack performance is recovered (S80), and ending a logic when the performance reaches a normal state (S90), as illustrated in FIG. 2.

In particular, a stack voltage may be measured while a fuel cell vehicle is being driven after hydrogen is charged in the fuel cell vehicle. Whether the stack voltage measured during the driving of the fuel cell vehicle after the hydrogen is charged is less than a reference voltage may then be determine. Further, in response to determining that the stack voltage is less than the reference voltage, purity of the hydrogen may be abnormal to confirm a driving condition. The driving condition may include temperature, pressure, coolant, and humidification states.

Meanwhile, when the stack voltage is greater than the reference voltage the method may include determining that the purity of the hydrogen is normal (S21) (e.g., no impurities are within the hydrogen). Then, whether the driving condition is normal may be determined and the polluted fuel may be exhausted, removed, and refilled when the driving condition is normal.

Further, when the driving condition is abnormal, the method may include determining that the performance is deteriorated based on the driving condition (S41). In addition, whether the fuel cell vehicle needs to be driven again for a short period of time may be determined. In response to determining that the vehicle requires additional driving, a logic of repeating start-on/off of the vehicle may be performed.

Additionally, when the fuel cell vehicle does not require additional driving for a short period of time (S60), of the method may include opening an air blocking valve based on the start-off of the fuel cell vehicle (S61). Whether performance of the stack is recovered may be determined and when the performance reaches a normal state in response to determining that the stack performance is received, the logic may be terminated. In addition, when the performance is not recovered, the method may include repeating an additional recovering logic and to perform an additional check (S81).

As described above, in an exemplary embodiment of the present disclosure, whether impurities are introduced may be detected using a sensor. In addition, whether performance abnormity is generated during driving of the vehicle within a predetermined time after the hydrogen is charged in the vehicle may be determined using the driving condition or the controller 60, and in response to determining that the driving condition is normal, the controller may be configured to determine that impurities are introduced after the fuel is filled.

In addition, the polluted fuel may be exhausted or removed and refilled after the introduction of the impurities is confirmed, the start-on/off of the vehicle may be repeated when the start-off is not performed, and thus, the vehicle may require additional driving for a short period of time, and the air blocking valve may be turned off when the start-off is performed, and thus, the vehicle may not require additional driving for a short period of time.

Meanwhile, effects and exemplary embodiments of the present disclosure will be described using the following Tables. In particular, exemplary embodiments indicate performance at the time of stopping injection of reaction gas including impurities and injecting high-purity reaction gas in a performance recovering test.

Figure 3:
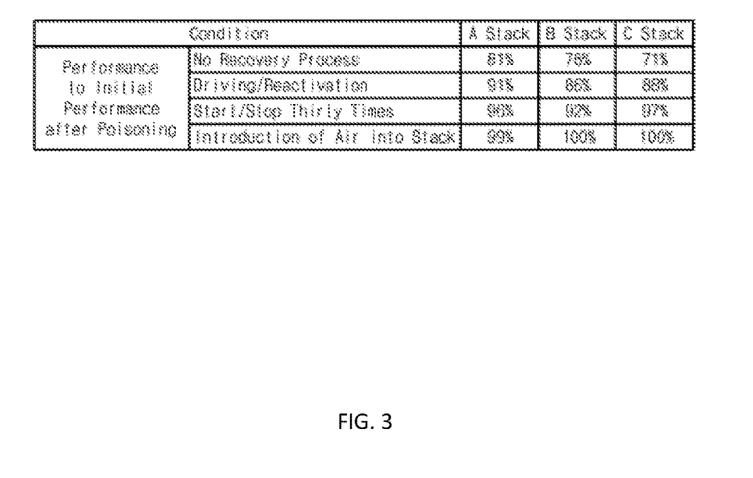
FIG. 3 illustrates a table showing a performance recovery tendency after poisoning impurities (CO), is an evaluation result after poisoning of the impurities within about several ppm is performed within one hour.
Figure 4:
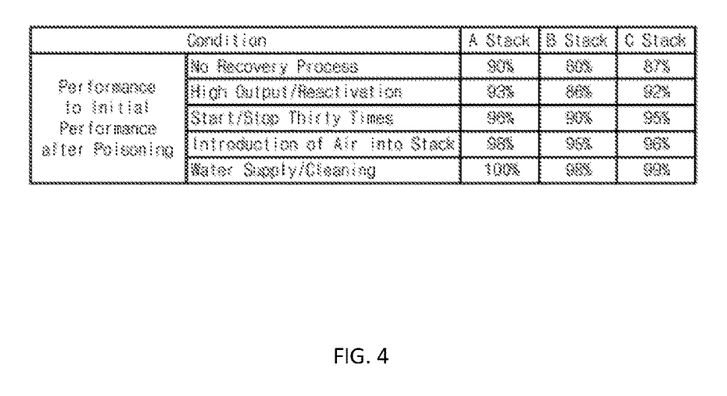
FIG. 4 illustrates a table showing a performance recovery tendency after poisoning impurities ($H_2S$), is an evaluation result after poisoning of the impurities within about several ppm is performed within one hour.

As shown in FIGS. 3 and 4, Table 1, which illustrates a performance recovery tendency after poisoning impurities (CO), is an evaluation result after poisoning of the impurities within about several ppm is performed within one hour, and Table 2, which illustrates a performance recovery tendency after poisoning impurities ($H_2S$), is an evaluation result after poisoning of the impurities within about several ppm is performed within one hour. In Tables 1 and 2, as a concentration and a time increase, a reduction in performance is intensified.

Referring to Tables 1 and 2, when measuring stack performance without performing a separate recovery process, the stack performance may be measured in normal temperature, humidification, and flow rate conditions of a predetermined level or greater, and during driving/reactivation and high output/reactivation, an idle situation and a high output may be repeatedly driven in normal temperature, humidification, and flow rate conditions, and thus, a predetermined driving time may be required until stack performance is recovered to a predetermined level.

In other words, a performance recovery rate after the poisoning is relatively low, and thus, it may be difficult for the vehicle to perform normal humidification/high output driving at the early stage of the driving. The fuel cell system mounted within the vehicle is a system performing humidification of the stack using water generated during system driving, and thus, it may be difficult to reveal normal performance due to shortage of an amount of water and difficult to recover performance through high output driving at the early stage of the driving. In other words, during poisoning impurities at a predetermined concentration or greater, it may be difficult to reveal performance during initial driving due to an output limitation, or the like, thus causing driving/reactivation to be difficult.

Meanwhile, when repeating start/stop of the vehicle to circulate a voltage, a recovery rate may increase during the increasing of the number of times of circulation of a potential. This is a driving control condition that more easily reveals a driving condition, requires a relatively shorter time for the recovery process, has a less limitation in driving temperature/humidification conditions, and the like, and it is easier to be utilized in the vehicle as compared with absence of a recovery process or driving (high output)/reactivation. In other words, a performance recovery effect to a recovery process by general driving such as absence of a recovery process or driving (high output)/reactivation may be revealed to be relatively substantial during intensifying the poisoning by an increase in an impurity concentration/exposure time.

In addition, it may be appreciated that when introducing air into the stack to open a stack inlet and a stack outlet in a room temperature condition to introduce the air, during the supplying of the air, there is an effect in performance recovery by desorption of impurities by formation of a high potential in an electrode and there is an effect in performance recovery by desorption of impurities by an oxidation reaction in an electrode, and when carbon monoxide, performance is recovered to a level of 100% after the air is introduced into a stack reaction surface. Further, it may be appreciated that when water is supplied to a gas reaction surface in the stack or the gas reaction surface is cleaned using water, when hydrogen sulfide, performance is not recovered up to a level of 100% by a recovery method such as potential circulation by start/stop repetition, air introduction, or the like, but is recovered to a level of 100% after the supplying of the water.

Moreover, the fuel cell system according to an exemplary embodiment of the present disclosure may include the supplying pipe 10 configured to supply the hydrogen and the air to the stack, the gas concentration sensor 20 configured to sense the impurities of the hydrogen and the air supplied to the supplying pipe 10, the supplying valve 30 disposed in the supplying pipe 10 to adjust the supplying of the hydrogen and the air, the discharging pipe 40 configured to discharge the hydrogen and the air from the stack, the discharging valve 50 disposed in the discharging pipe 40 to adjust the discharging of the hydrogen and the air, the controller 60 operated together with the gas concentration sensor 20 to determine the introduction of the impurities, and the exhaust valves disposed at the front end and the rear end of the stack to remove the polluted fuel in response to detect the introduction of the impurities.

As described above, according to the exemplary embodiment of the present disclosure, when rapid performance deterioration is generated due to the introduction of the impurities into the fuel cell system, a cause of the rapid performance deterioration may be determined, and when a normal operation is difficult due to damage to main components of the stack caused by the introduction of the impurities, performance of the stack may be recovered to a normal level, thus improving marketability and stability of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell system, comprising:
a supplying pipe configured to supply hydrogen and air to a stack;
a gas concentration sensor configured to sense impurities of the hydrogen and the air supplied to the supplying pipe;
a supplying valve disposed in the supplying pipe to adjust the supplying of the hydrogen and the air;
a discharging pipe configured to discharge the hydrogen and the air from the stack;
a discharging valve disposed in the discharging pipe to adjust the discharging of the hydrogen and the air;
a controller configured to be operated together with the gas concentration sensor to detect introduction of the impurities; and
exhaust valves disposed at a front end and a rear end of the stack to remove a polluted fuel in response to detecting the introduction of the impurities,
wherein the controller is further configured to:
determine whether a stack voltage is dropped due to the impurities of the hydrogen;
control the supplying valve and the exhaust valves to exhaust hydrogen and air in the stack and to supply hydrogen and air into the stack when it is determined that the stack voltage is dropped due to the impurities of the hydrogen; and
perform a logic of repeating start-on/off of the fuel cell system for predetermined times.

2. The fuel cell system according to claim 1, further comprising:
a stack inlet blocking valve disposed between the supplying pipe and the stack to block introduction of the hydrogen or the air into the stack.

3. The fuel cell system according to claim 1, wherein:
the supplying pipe includes: a hydrogen supplying pipe configured to supply the hydrogen and an air supplying pipe configured to supply the air,
the gas concentration sensor includes a hydrogen gas concentration sensor configured to sense the impurities of the hydrogen and an air gas concentration sensor configured to sense the impurities of the air,
the supplying valve includes a hydrogen supplying valve configured to adjust the supplying of the hydrogen and an air supplying valve configured to adjust the supplying of the air,
the discharging pipe includes a hydrogen discharging pipe configured to discharge the hydrogen and an air discharging pipe configured to discharge the air, and
the discharging valve includes a hydrogen discharging valve configured to adjust the discharging of the hydrogen and an air discharging valve configured to adjust the discharging of the air.

4. The fuel cell system according to claim 1, wherein the controller includes:
a controlling part configured to store a driving condition including temperature, humidification, and pressure while a vehicle is being driven to determine whether the driving condition is normal and a level of normality; and
a diagnosing part configured to be operated together with the controlling part and determine the driving condition and a diagnosed resistance value to determine whether the impurities are introduced and a level of the introduction of the impurities using the controlling part.

5. The fuel cell system according to claim 4, wherein the controlling part is configured to recover performance of the stack after the fuel is removed.

6. A method of controlling a fuel cell system, comprising:
measuring, by a controller, a stack voltage during driving of a fuel cell vehicle after hydrogen is charged in the fuel cell vehicle using a sensor;
determining, by the controller, whether the stack voltage is less than a reference voltage;
confirming a driving condition when the stack voltage is less than the reference voltage;
determining whether the driving condition is normal;
exhausting, by the controller, hydrogen in a stack and supplying, by the controller, hydrogen into the stack when the driving condition is normal; and
performing, by the controller, a logic of repeating start-on/off of the fuel cell system.

7. The method of controlling a fuel cell system according to claim 6, wherein the driving condition includes temperature, pressure, coolant, and humidification states.

8. The method of controlling a fuel cell system according to claim 6, wherein, in the step of determining whether the stack voltage is less than the reference voltage, when the stack voltage is greater than or equal to the reference voltage, it is determined, by the controller, that a purity of the hydrogen is normal.

9. The method of controlling a fuel cell system according to claim 6, further comprising determining that a performance of the fuel cell system is deteriorated due to the driving condition when the driving condition is not normal.

10. The method of controlling a fuel cell system according to claim 6, further comprising:
   determining, by the controller, whether the fuel cell vehicle requires additional driving for a predetermined period of time; and
   controlling to open an air blocking valve based on start-off of the fuel cell system when the fuel cell vehicle does not require additional driving.

11. The method of controlling a fuel cell system according to claim 6, further comprising:
   determining, by the controller, whether a performance of the stack is recovered; and determining, by the controller, that the performance reaches a normal state to end the logic of repeating start-on/off of the fuel cell system when the performance of the stack is recovered.

* * * * *